(12) United States Patent
Canova, Jr. et al.

(10) Patent No.: US 6,906,741 B2
(45) Date of Patent: Jun. 14, 2005

(54) SYSTEM FOR AND METHOD OF CONFERENCING WITH A HANDHELD COMPUTER USING MULTIPLE MEDIA TYPES

(75) Inventors: Francis J. Canova, Jr., Fremont, CA (US); Albert H. Ting, Santa Clara, CA (US)

(73) Assignee: Palm, Inc., Santa Clara, CA (US)

( * ) Notice: Subject to any disclaimer, the term of this patent is extended or adjusted under 35 U.S.C. 154(b) by 314 days.

(21) Appl. No.: 10/158,704

(22) Filed: May 30, 2002

(65) Prior Publication Data

US 2003/0142200 A1 Jul. 31, 2003

Related U.S. Application Data

(60) Provisional application No. 60/352,785, filed on Jan. 29, 2002.

(51) Int. Cl.$^7$ ................................................. H04N 7/14
(52) U.S. Cl. ................................. 348/14.08; 348/14.01; 379/93.21; 455/556.1
(58) Field of Search ........................... 348/14.01–14.16; 455/556.1–557; 379/93.08, 93.17, 93.21, 110.01

(56) References Cited

U.S. PATENT DOCUMENTS

| | | | |
|---|---|---|---|
| 5,208,745 A | | 5/1993 | Quentin et al. |
| 5,900,875 A | * | 5/1999 | Haitani et al. ............... 345/840 |
| 5,907,604 A | | 5/1999 | Hsu |
| 6,252,544 B1 | | 6/2001 | Hoffberg |
| 6,332,163 B1 | | 12/2001 | Bowman-Amuah |
| 6,345,279 B1 | | 2/2002 | Li et al. |
| 6,389,457 B2 | | 5/2002 | Lazaridis et al. |
| 6,401,085 B1 | | 6/2002 | Gershman et al. |
| 6,429,812 B1 | | 8/2002 | Hoffberg |
| 6,438,585 B2 | | 8/2002 | Mousseau et al. |
| 6,438,594 B1 | | 8/2002 | Bowman-Amuah |
| 6,633,314 B1 | * | 10/2003 | Tuli ........................... 345/744 |
| 6,633,761 B1 | * | 10/2003 | Singhal et al. ............... 455/436 |
| 6,646,672 B2 | * | 11/2003 | Feierbach ................ 348/14.02 |
| 2002/0163548 A1 | * | 11/2002 | Chiu et al. .................. 345/864 |

FOREIGN PATENT DOCUMENTS

| | | | | |
|---|---|---|---|---|
| EP | 1093281 A2 | * | 4/2001 | ............ H04M/3/54 |
| GB | 2313258 | | 11/1997 | |

OTHER PUBLICATIONS

Raychaudhuri, D. et al., "Mobile Multimedia Applications in the WATMnet Broadband Wireless System: Software Architecture and Media Processing Considerations", *Signals Systems & Computers*, 1998. Conference Record of the 32$^{nd}$ Asilomar Conference on Pacific Grove, CA, USA, Nov. 1–4, 1998, Piscataway, NJ, USA, IEEE, US, Nov. 1, 1998, pp. 73–77, XP010324332, ISBN: 0–7803,5148–7, p. 73–p. 75.
Form PCT/ISA/220 (Jul. 1998) for PCT International application No. PCT/US 02/37216 dated Mar. 11, 2003.

* cited by examiner

*Primary Examiner*—Wing F. Chan
(74) *Attorney, Agent, or Firm*—Foley & Lardner LLP

(57) ABSTRACT

A method of videoconferencing is disclosed. The method of videoconferencing includes initiating, with a first handheld computer, a conferencing call with a second handheld computer. The method also includes communicating, by the first handheld computer to the second handheld computer, a combination of at least two of video data, audio data, text data, and application data. Further, the method includes accessing selectively and substantially simultaneously, by the second handheld computer a combination of at least two of video data, audio data, text data, and application data.

20 Claims, 6 Drawing Sheets

SYSTEM FOR AND METHOD OF CONFERENCING WITH A HANDHELD COMPUTER USING MULTIPLE MEDIA TYPES

REFERENCE TO RELATED APPLICATIONS

This application claims the benefit of U.S. Provisional Application No. 60/352,785, filed Jan. 29, 2002, the entirety of which is herein incorporated by reference.

The present application is also related to U.S. patent application Ser. No. 10/159,398, entitled VIDEOCONFERENCING BANDWIDTH MANAGEMENT FOR A HANDHELD COMPUTER SYSTEM AND METHOD, which is filed on the same day herewith by the same inventors and assigned to the same assignee as the present application.

BACKGROUND

The present invention relates to methods and systems associated with mobile computing devices. More specifically, the present invention relates to a system for and method of conferencing via a handheld computer. More specifically still, the present invention relates to conferencing with the use of a handheld computer in which multiple data types may be communicated and used during a conference call.

Mobile communications and computation devices come in many forms, but conventionally the designs of such mobile devices make portability versus utility compromises. For example, a watch is conventionally a very portable device, but of limited functionality. If a watch included a 20-inch monitor, for example, attached to it, the user could display, navigate, and interact with the system to a very high degree. However, in this exaggerated example, the watch would be of very low portability. Handheld computer, personal digital assistant, and mobile phone designers, among others, are especially aware of this tradeoff, especially as these devices are being asked to include more functionality and asked to carry out more sophisticated tasks. However, although the mobile devices are being asked to provide more functionality, a paramount requirement is that the device remain easily portable.

Conventional systems and methods exist which provide video content to handheld computers. For example, PACKETVIDEO of San Diego, Calif., provides an Internet service called PV AirGuide. The PV AirGuide service provides for streaming video-on-demand where a user can select a channel, such as news, sports, or entertainment to view video information as would be available on broadcast television or radio. PV AirGuide also provides other mobile multimedia, including a live camera application called AirCam which feeds video from a video feed to a mobile device. For example, an AirCam live stream camera can provide live shots of traffic in central London to mobile devices throughout the world. Nevertheless, PV AirGuide's streaming video-on-demand and live camera displays provide only broadcast-television type of communications. Interactive videoconferencing is not available or possible.

Accordingly, there is a need for providing highly mobile devices (e.g., handheld computers, personal digital assistants, mobile phones, and watches) with functionalities conventionally limited to less portable devices that have more rich and usable computation, communication, or interaction capabilities. There is also a need for a mobile device to provide videoconferencing communications with other portable and/or non-portable devices. Further, there is a need for a mobile device to provide conferencing communications with multiple media types during a conference call.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs

SUMMARY

The present invention relates to a method of videoconferencing. The method of videoconferencing includes initiating, with a first handheld computer, a conferencing call with a second handheld computer. The method also includes communicating, by the first handheld computer to the second handheld computer, a combination of at least two of video data, audio data, text data, and application data. The method further includes accessing selectively and substantially simultaneously, by the second handheld computer a combination of at least two of video data, audio data, text data, and application data.

Another exemplary embodiment of the invention relates to a handheld computer. The handheld computer includes a processor, a memory coupled to the processor, a display coupled to the processor, and a conferencing program stored in the memory and including functionality to access, either individually or simultaneously, at least two data types including video data, audio data, text data, and application data during a conference.

Yet another exemplary embodiment of the invention relates to a method of accessing data. The method of accessing data includes establishing a conference call using a handheld computer, outputting a first data type by the handheld computer, the first data type being one of video data, audio data, text data, and application data, switching selectively between data types being output by the handheld computer, while maintaining the conference call.

Yet another exemplary embodiment of the invention relates to a method of accessing data. The method of accessing data includes establishing a videoconference using a handheld computer, displaying a video feed on the handheld computer, the video feed being at least a portion of a videoconferencing feed, displaying simultaneously a text message on the handheld computer, the text message being received simultaneously with the video feed.

Yet still another exemplary embodiment of the invention relates to a method of accessing data. The method of accessing data includes establishing a videoconference using a handheld computer, providing a video feed on the handheld computer, the video feed being at least a portion of a videoconferencing feed, providing an audio feed on the handheld computer, the audio feed being at least a portion of the videoconferencing feed, displaying simultaneously application data on the handheld computer, the application data being at least a portion of the videoconferencing feed.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
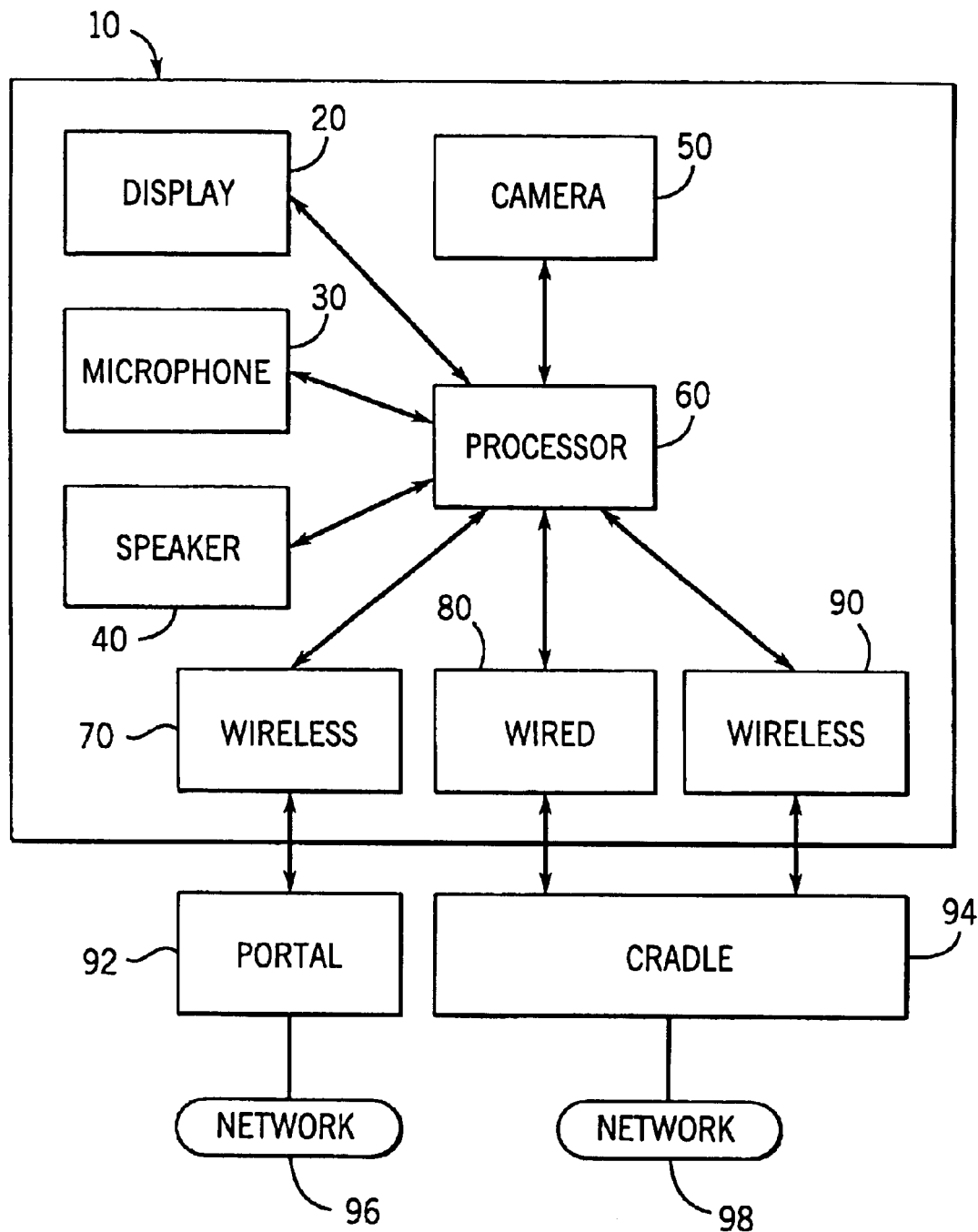
FIG. 1 is a general block diagram of a mobile device system in accordance with an exemplary embodiment.

FIG. 1 illustrates a mobile device 10 that can include a display 20, a microphone 30, a speaker 40, a camera 50, a processor 60, a wireless interface 70, a wired interface 80, and a wireless interface 90. Display 20 can be any of a variety of displays, such as, a thin film transistor (TFT) display, a liquid crystal display (LCD), a plasma display, or any other presentation device. Microphone 30 can be any of a variety of devices configured to receive audio signals. Speaker 40 can be any of a variety of devices configured to produce audio sounds. Camera 50 can be a digital camera, a video camera, or any other device for capturing images.

Processor 60 can be a circuit configured to receive signals from display 20, microphone 30, speaker 40, camera 50, wireless interface 70, wired interface 80, and wireless interface 90. Wireless interface 70 facilitates communication with a portal 92. Wired interface 80 and wireless interface 90 facilitate communication with cradle 94. Portal 92 can include a server capable of receiving wireless communications and manage communications with a network 96. Network 96 can be the Internet or any other type of network.

Wired interface 80 provides a communication link between device 10 and cradle 94 when device 10 is physically placed in cradle 94. Cradle 94 can provide connectivity to a network 98. Network 98 can include a person computer with which device 10 synchronizes data, multiple computers coupled to each other over a local area network (LAN), an intranet, the Internet, or any other type of network.

Device 10 can communicate videoconferencing information, including image data, video data, audio data, text data, and application data to multiple participants. Device 10 can be placed in cradle 94 during the video conference such that communications are made via network 98. Alternatively, device 10 can be in wireless communication with networks via portal 92 or cradle 94. In such an embodiment, cradle 94 is capable of receiving and sending wireless communications.

Figure 2:
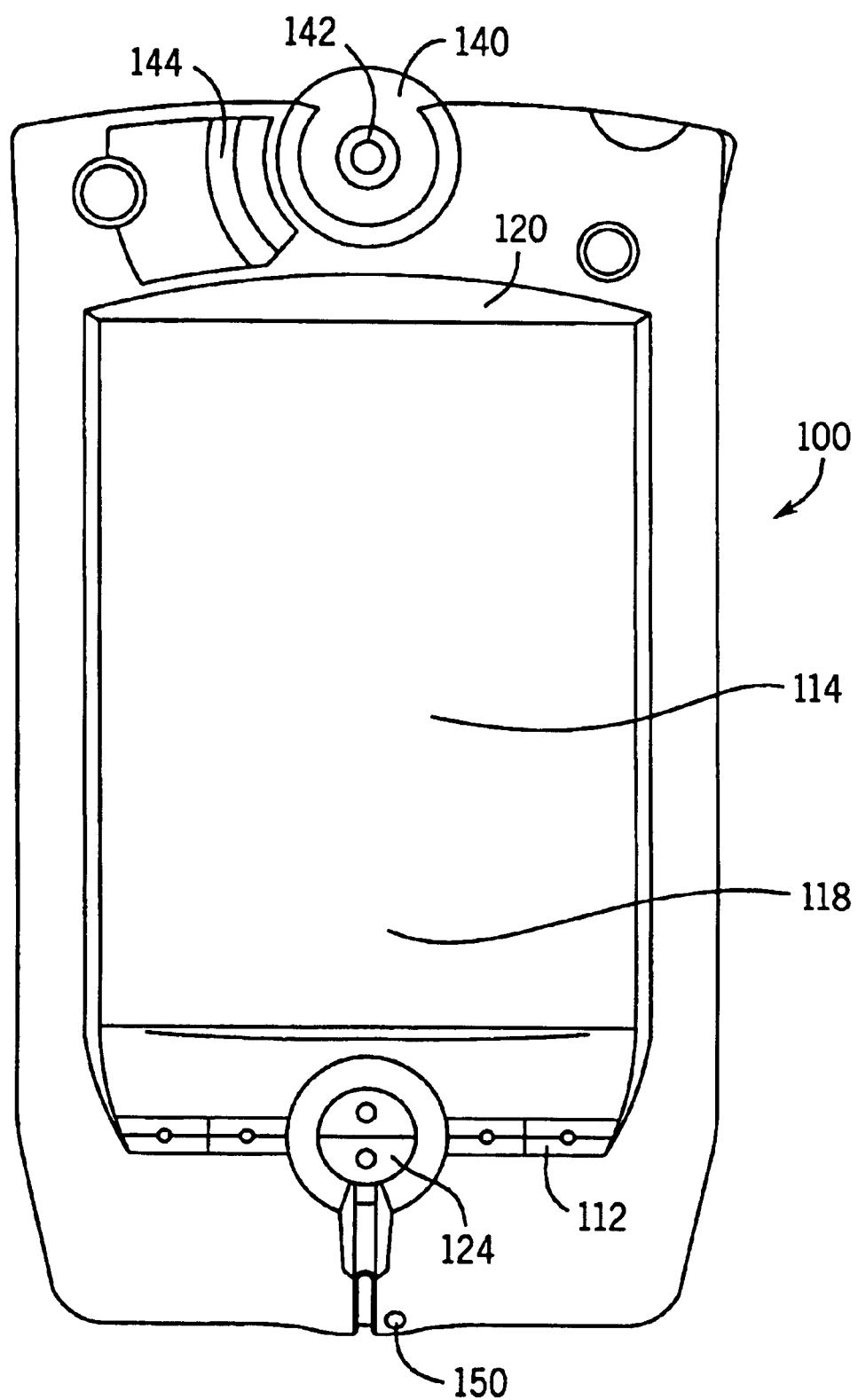
FIG. 2 is a diagrammatic representation of a mobile device in accordance with an exemplary embodiment.

Referring to FIG. 2, a handheld computer 100 is depicted according to an exemplary embodiment. Handheld computer 100 may include Palm style computers manufactured by Palm, Inc., of Santa Clara, Calif. Other exemplary embodiments may include handheld devices or personal digital assistants (PDAs), such as, the COMPAQ iPAQ manufactured by Compaq Computer Corporation of Houston, Tex., or other devices operating with the Windows CE or Pocket PC operating system sold by Microsoft Corporation of Redmond, Wash. Handheld computer 100 is representative of the type of mobile device which may use the invention disclosed and/or be part of the inventive system disclosed. Handheld computer 100 is described as "handheld" to indicate a small, portable size as compared to less portable computing devices. Handheld computer 100 can also be located on a desk, a lap, a wrist, a belt, or any other position or location.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity, wireless messaging, e-mail, always-on e-mail, and wireless telephony.

Handheld computer 100, depicted in FIG. 2 includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 2, in an exemplary embodiment, display 114 also can include a GRAFFITI™ (or other handwriting recognition software) writing section 118 for entering alpha-numeric characters. A plurality of input icons for performing automated or preprogrammed functions may be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communication signals using an RF transceiver. Antenna 120 can further include an indicator light 125 for indicating the transmission and reception of wireless communication signals. Further, light 125 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

Figure 5:
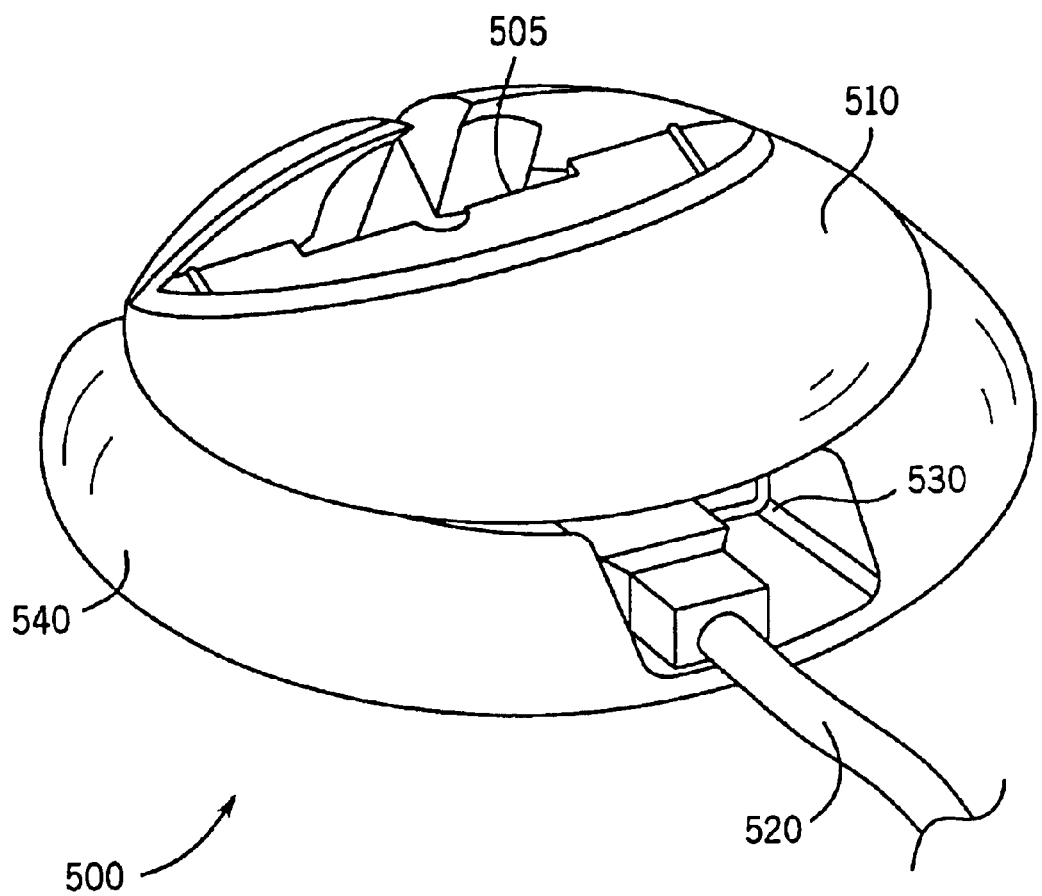
FIG. 5 is a cradle configured to receive the mobile device of FIG. 2.

In an exemplary embodiment, handheld computer 100 may be coupled to a cradle, such as a synchronization cradle 500 (FIG. 5). Cradle 500 may include a platform 510 configured to receive handheld computer 100 in a recess 505, and a data cord 520 (which, in an exemplary embodiment may be, but is not limited to, a universal serial bus (USB) cord) that may be coupled to a personal computer. In an exemplary embodiment, cradle 500 may also include a receptacle 530 for plugging in a power supply cord. In a particularly preferred embodiment, the power cord may be coupled to a wall outlet to supply power to the cradle (alternatively, the cradle may draw power through the data cord from the personal computer) for powering handheld computer 100 or for recharging the batteries of handheld computer 100. In an exemplary embodiment, cradle 500 may include a base 540 supporting platform 510. Platform 510 may be movable relative to base 540, that is, platform 510 may be tiltable and/or swivelable relative to base 540. In an exemplary embodiment, cradle 500 may be used for holding handheld computer 100 in a position suitable for videoconferencing, and further, may be used as an alternative connection to a communications network for videoconferencing.

Handheld computer 100 can include a video camera 140 and a speaker 144. In an exemplary embodiment, video camera 140 includes a lens portion 142 and is formed as an integral part of handheld computer 100. Alternatively, video camera 140 can be separate from handheld computer 100 and attached as a peripheral device. Where video camera 140 is integral to handheld computer 100, lens portion 142 can be located in a recessed position.

Speaker 144 can be any of a variety of audio speakers capable of reproducing human voice communications, such as, voices of participants in a video conference. Preferably, speaker 144 is integral to handheld computer 100. Handheld computer 100 also includes a microphone 150 that is integral to handheld computer 100. Microphone 150 is configured to receive and transmit audio signals at handheld computer 100. In the example of a video conference, microphone 150 can receive and communicate the voice of the handheld user.

The locations of speaker 144, microphone 150, and video camera 140 are exemplary only. Alternative embodiments may locate speaker 144, microphone 150, and video camera 140 in a variety of different places. Likewise, the configurations (e.g., size, shape) of speaker 144, microphone 150, and video camera 140 are also for illustrative purposes only.

Figure 3:
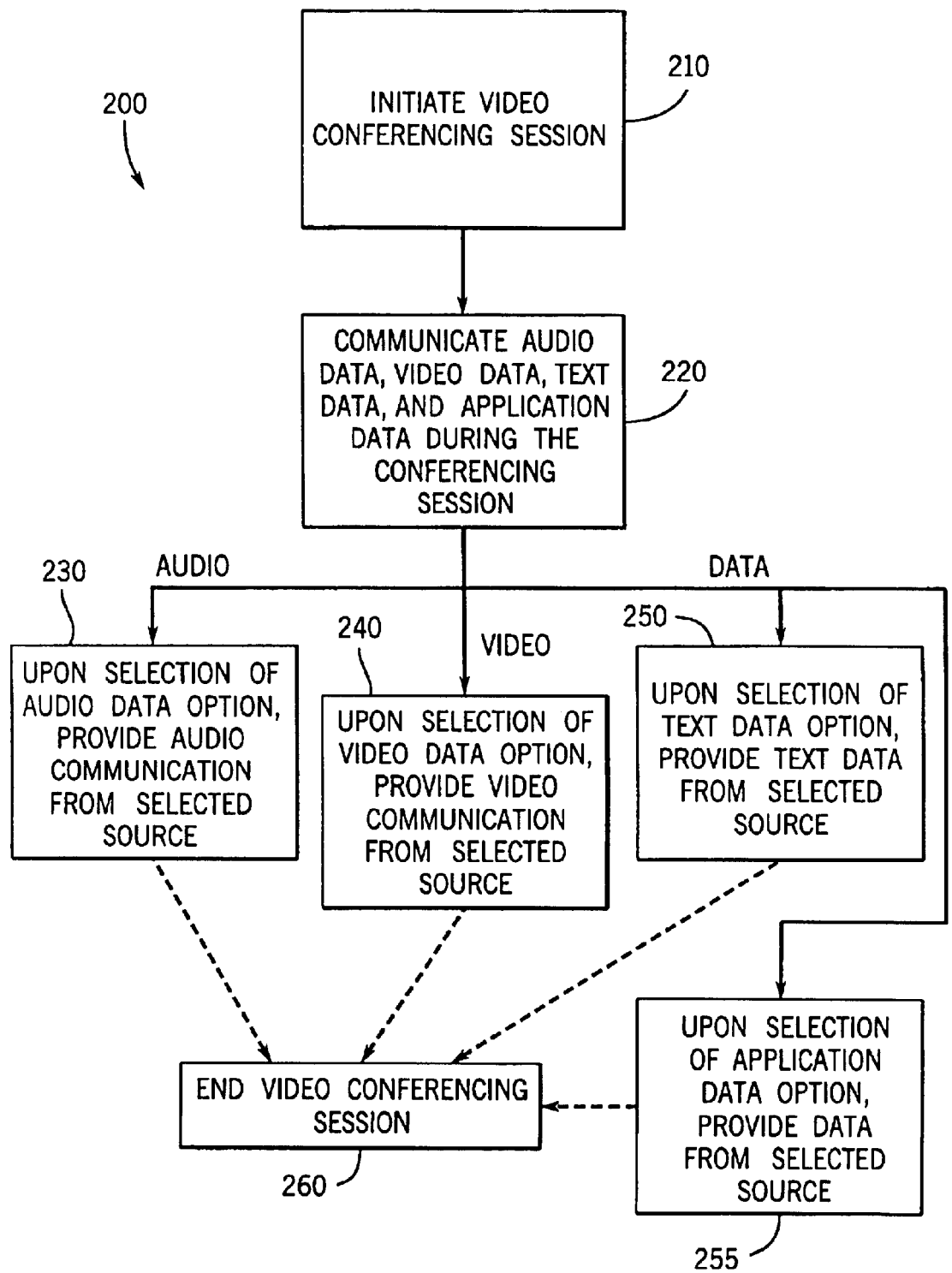
FIG. 3 is a flow diagram of a videoconferencing process in accordance with an exemplary embodiment.

FIG. 3 illustrates a flow diagram 200 depicting an exemplary method of videoconferencing via a handheld computer. Flow diagram 200 can illustrate exemplary processes of video communication utilizing handheld computer 100 described with reference to FIG. 2. In a step 210, a videoconferencing session can be initiated. In an exemplary embodiment, a videoconferencing session can be initiated by the user of a handheld computer by dialing a call-in number using an application-specific videoconferencing software program in the handheld computer. In such a program, the user can dial a videoconferencing telephone number to log in as a participant in the video conference. Alternatively, a videoconferencing session can be initiated by the receipt of a communication via wireless communication from another device. In such an embodiment, the user of a handheld computer is alerted to the beginning of a video conference and given the option to join.

After the videoconferencing session is initiated, a step 220 can be performed in which audio data, video data, text data, and/or application data information can be communicated among participants in the video conference during the conference session. By way of example, participants in the videoconferencing session can share and communicate a wide variety of different information. For example, participants can view video images of any and/or all participants to the videoconferencing session. Other video can also be viewed by participants, such as, previously stored video clips, live broadcast video, or any other visual communication. Similarly, a wide variety of audio data, text data, and/or application data can be selectively presented and accessed during the video conference.

In a step 230, a user of a handheld computer can make a selection of an audio data mode or option on the handheld computer to provide audio communication from a selected source. For example, an audio data option may be selectable from one of a plurality of input function keys 112 or input icons 151, 152, 153, 154, and 155 on display 114 and/or writing section 118 on handheld computer 100 described with reference to FIG. 2. Icon 151 returns a user to a "home" location. Icon 152 toggles a text mode or text option. Icon 153 toggles a "scribble" mode or "scribble" option, which allows a user to enter free form drawings using a stylus or other input device, or further allows a user to view free form drawings entered by other conference participants. Icon 154 toggles on a video mode or video option in which video can be received from and/or sent to other conference participants. Icon 155 toggles on an audio mode or audio option and allows the user to manipulate audio options, such as mute, etc.

An exemplary audio data option may be to present or provide audio data from a currently speaking participant during the video conference. The currently speaking participant may change from one videoconferencing participant to another depending on who is speaking at any one time. Such audio data may be delayed or streamed in a substantially real-time manner. Audio data may be used in a variety of data formats including Motion Pictures Experts Group (MPEG) formats including but not limited to MPEG3, among many other formats. Alternatively, another audio data option may be to provide audio data from all participants to the videoconferencing session. Yet another audio data option may allow the user to mute the microphone at the user's handheld computer such that audio data is not received or transmitted while mute is selected.

In a step 240, the user of the handheld computer can select a video data option to provide video communication from a selected source. A video data option can be selected using input function keys or icon 154 on the display of the handheld computer. As previously discussed, video sources during the video conference can include live video of participants of the video conference, video from other live cameras, pre-recorded video clips, or any other visual input. Such video data may be delayed or streamed in a substantially real-time manner. Video data may be used in a variety of formats including Motion Pictures Experts Group (MPEG) formats including but not limited to MPEG3, among many other formats. One video option may provide for the presentation or display of multiple windows at the handheld computer, each window display containing a different participant to the videoconferencing session. In yet another embodiment, a video option may be provided to show a currently speaking participant in one window and presentation slides or any kind of visual aid in another window. As such, participants in the video conference can view a speaker at the same time the speaker's presentation slides are viewed.

In a step 250, a user of a handheld computer, during, for example, a videoconferencing session, can select a text data option, using icon 152, to provide text data communicated from a selected source. As with the audio data option described with reference to step 230 and the video data option described with reference to step 240, the text data option can be selected using a function key or input icon 152 on the display screen. Once the text data option is selected, the user can select to present, generate, access, or receive any of a variety of different data sources. In an exemplary embodiment, text messages may be sent to all participants of a video conference or any subset of the participants. Further, text messages may be composed, sent and/or received during the transmissions of other types of data.

In a step 255, a user of a handheld computer, during a videoconferencing session can select an application data option, such as but not limited to the scribble option using icon 153, to provide application data communicated from a selected source. As with the audio data option, the video data option, and the text data option described, the application data option can be selected using a function key or input icon 153 on the display screen. Once the application data option is selected, the user can select to present, compose, access, and/or receive a combination of different data types available. For example, a participant to the video conference may desire to retrieve and/or compose application data, such as but not limited to a word processing document, a spreadsheet, a presentation slide show, an interactive sketch pad (scribble), or any other of a variety of different data files to use during the videoconferencing session.

Even though steps 230, 240, 250, and 255 are described with reference to FIG. 3 in flow diagram 200, steps 230, 240, 250, and 255 can be performed in any order, as many times, or not at all during a videoconferencing session. For example, a handheld computer user may change selections of audio (step 230) from mute to listen to all participants several times during the session. Similarly, the handheld computer user may change or toggle (or switch) between different video presentation views (step 240) during a session. For example, a user may want to switch back and forth between video images of different participants to the video conference. Further, a user may want to access any combination of data types available during the videoconference. For example, a user may wish to view and listen to a speaker, access a presentation document, and communicate with another participant via a text message, all during the conference call.

Once the videoconferencing session is over or the handheld computer user wants to end participation in the session, the videoconferencing session can be ended in a step 260. In an exemplary embodiment, the videoconferencing session can be ended by selection of an end icon or end function key on the handheld computer. Alternatively, the videoconferencing session can be ended from a remote location. A wide variety of different options may be available at the end of a videoconferencing session. For example, an option may be provided to present to each participant of the videoconferencing session for the scheduling of a next meeting using the videoconferencing equipment. Advantageously, where multiple participants to the videoconferencing sessions are using a handheld computer, such as, handheld computer 100 described with reference to FIG. 2, possible times for a next videoconferencing session can be presented to the participants based on information stored in the organizer or calendar programs included in the memory of the handheld computer.

A wide variety of other applications may be available using the functionality present with the handheld computer. For example, still photos stored in the memory of the handheld computer can easily be presented during the video conference. Similarly, documents stored in the memory of a handheld computer can be shared, reviewed, and edited by any and/or all participants to the videoconferencing session. For example, a report requiring input from multiple employees in multiple locations can be compiled by the four employees while participating in a videoconferencing session. As such, the employees can discuss, face-to-face the report while compiling and editing the report at the same time using the data option in the videoconferencing session.

Figure 4:
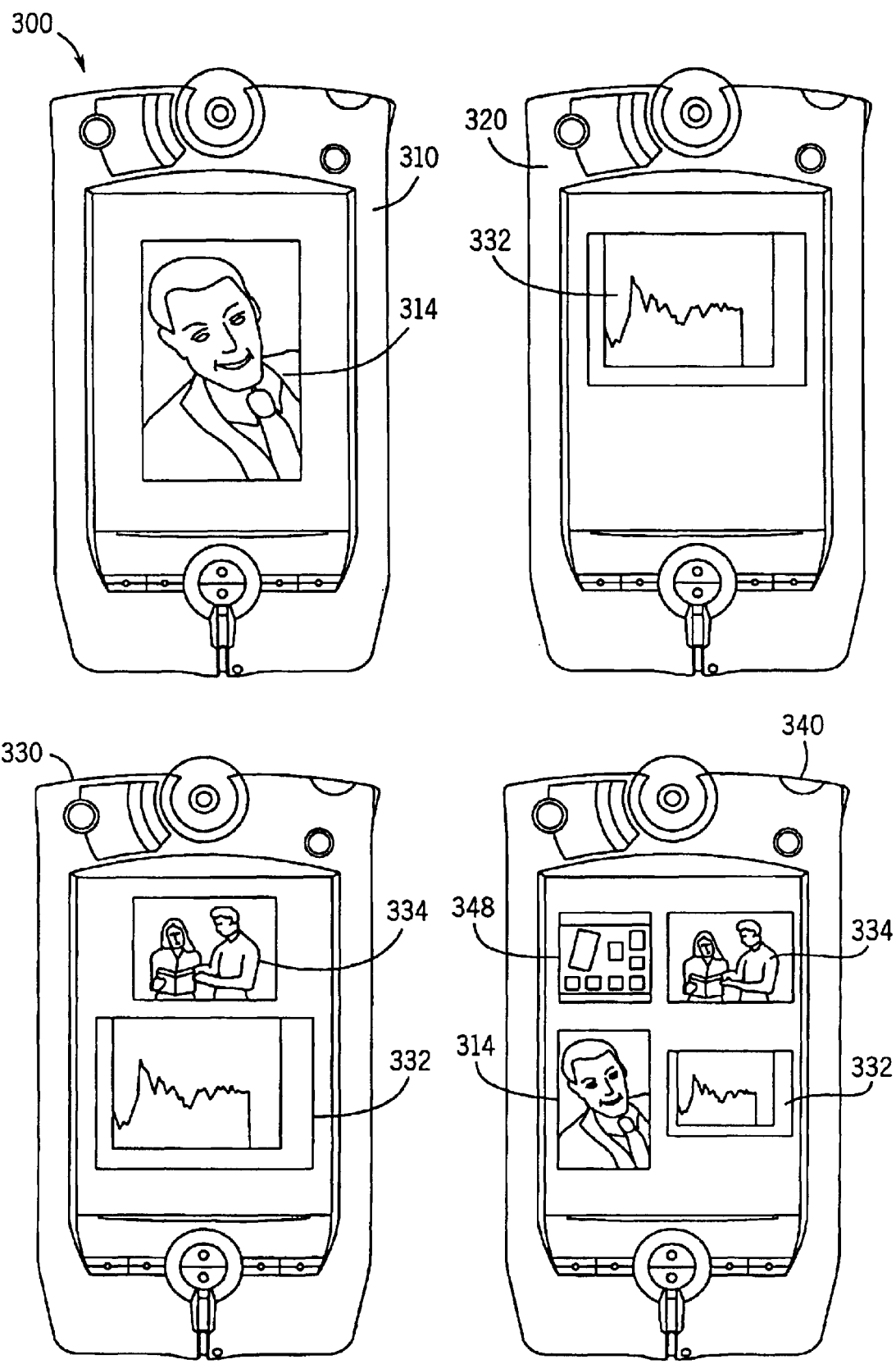
FIG. 4 is a diagrammatic representation of a video conference utilizing the mobile device of FIG. 2 in accordance with an exemplary embodiment.

FIG. 4 illustrates a videoconferencing session 300 among at least four participants. In videoconferencing session 300, a conference participants using devices 310, 320, 330, and 340 can communicate an share information. Devices 310, 320, 330, and 340 are similar to handheld computer 100 described with reference to FIG. 2.

In an exemplary videoconferencing session, a participant using device 330 can sketch a graph 332 using device 330. Graph 332 can be selectively viewed and edited by other devices in the conference while continually hearing audio from any or all of devices 310, 320, 330, and 340. In lieu of viewing graph 332 as a working document, devices in the video conference can view graph 332 as a still, non-moving graph.

By way of example, at any moment during a videoconferencing session device 310 can show a video 314 of another participant in the conference while device 320 can show graph 332 accompanying the discussion while device 330 can show graph 332 and a video 334 of conference participants. At the same time, device 340 can show graph 332, videos 314 and 334 of conference participants, and additional information, such as, a web page 348.

Advantageously, each videoconferencing session participant can selectively control content displayed at a particular device. Further, participants can participate in the creation and editing of documents as if participants were all in the same room by using devices communicating in the videoconferencing session.

Figure 6:
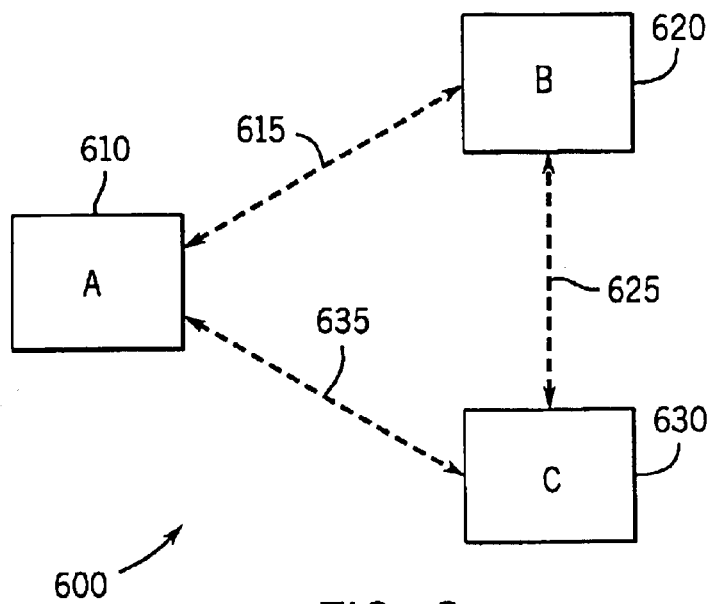
FIG. 6 is an exemplary block diagram of an ad hoc videoconferencing system.
Figure 7:
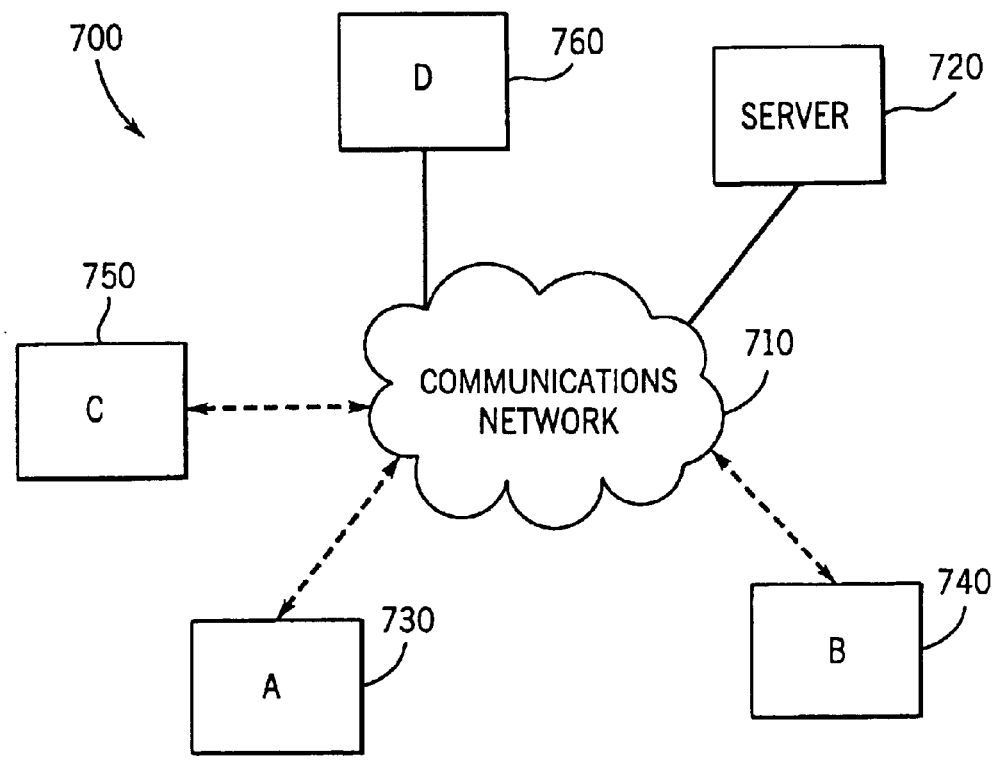
FIG. 7 is an exemplary block diagram of a fixed videoconferencing system.

Referring now to FIGS. 6 and 7, videoconferencing images, audio and data can be transmitted in a variety of different modes. For example, a wireless ad hoc network (FIG. 6), or the Internet (or other communications network, FIG. 7), can be utilized to communicate the necessary data. Ad hoc networking provides for the interaction of multiple devices using spontaneous, wireless communication between devices. In yet another embodiment, a combination of an ad hoc network and the Internet or a corporate intranet can be used for communication of the video conference.

Referring now to FIG. 6, an ad hoc network 600 is depicted. Ad hoc network 600 includes a handheld or portable device A 610, a second handheld or portable device B 620, and a third handheld or portable device C 630. Devices 610, 620, and 630 are configured with wireless transceivers such that they are able to communicate with each other over wireless links 615, 625, and 635. In such a situation, a video conference may be set up by participants using devices 610, 620, and 630 and a fixed network infrastructure is not required. Devices 610, 620, and 630 may utilize any of a variety of communications protocols including IEEE 802.11 protocols, Bluetooth, and the like.

In another exemplary embodiment, a video conference system 700 is depicted in FIG. 7. Video conference system 700 includes a communications network 710, a server 720 coupled to communications network 710, and portable devices A 730, B 740, and C 750. Further, a device D 760, such as a desktop computer, may be coupled to communications network 710 in a wired fashion, such as over a telephone line, a digital subscriber line, a T1 line, an Ethernet connection, or the like. Device D may also be a participant in the video conference with participants 730, 740 and 750. In an exemplary embodiment, devices 730, 740 and 750 may have access to communications network 710 via access points that are coupled to communications network 710. Accordingly, a video conference may be set up between devices 730, 740, 750, and 760, all communications being directed over communications network 710 and to server 720. Server 720 may be a conferencing server that receives communications from devices 730, 740, 750, and 760 and sends the communications back to the participants 730, 740, 750, and 760 after coordinating and directing the information.

In yet another exemplary embodiment, system 600 and system 700 may be combined in which some of the participants communicate in an ad hoc manner and others communicate over a fixed communications network such as network 710. Such a situation is a hybrid videoconferencing system utilizing both ad hoc networking and fixed communications network infrastructure.

An exemplary embodiment may utilize, be executed by, and/or be applied in a handheld computer including a processor such as but not limited to a Dragonball processor running at clock speeds of 33 MHz, 66 MHz, or other clock speeds, the Dragonball processor being available from Motorola Inc. of Schaumburg, Ill. An exemplary handheld computer may also include, but is not limited to, four (4) megabytes (MB) of flash read only memory (ROM) for storing BIOS information, operating system information, and other information. The flash ROM may be used to store, but is not limited to, any of a number of versions of the Palm operating system (OS) available from Palm, Inc. of Santa Clara, Calif. Further, an exemplary handheld computer may also include, but is not limited to, thirty-two (32) MB of synchronous dynamic random access memory (SDRAM) for storing program information, and other information to be used by the handheld computer. In an alternative embodiment, the handheld computer may also use a digital signal processor including an advanced RISC machine (ARM) processor available from Texas Instruments of Dallas, Tex. and may use, but is not limited to, a Linux based operating system.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of accessing data, comprising:
    positioning a camera integrated into a handheld computer to focus on a participant in the videoconference;
    establishing a videoconference using a handheld computer;
    displaying a video feed on the handheld computer, the video feed being at least a portion of a videoconferencing feed;
    displaying simultaneously a text message on the handheld computer, the text message being received simultaneously with the video feed.

2. A method of videoconferencing, comprising:
    positioning a camera, integrated with a first handheld computer, in the direction of a first videoconference participant;
    initiating, with the first handheld computer, a conferencing call with a second handheld computer;
    communicating, by the first handheld computer to the second handheld computer, a combination of at least two of video data, text data, and application data; and
    accessing selectively and substantially simultaneously, by the second handheld computer a combination of the at least two of video data, text data, and application data from the first handheld computer.

3. The method of claim 2, further comprising:
    switching by the second handheld computer between accessing any combination of video data, text data, and application data.

4. The method of claim 2, wherein the video data includes MPEG3 (MP3) data.

5. The method of claim 2, wherein the application data includes word processing data.

6. The method of claim 2, wherein the application data includes presentation application data.

7. The method of claim 2, further comprising:
    initiating, by the first handheld computer, a conferencing call with a conferencing device.

8. The method of claim 2, further comprising:
    coupling the first handheld computer to a synchronization cradle to access a conferencing server via the synchronization cradle and for holding the camera that is integrated with the handheld computer in a relatively fixed orientation.

9. A handheld computer, comprising:
    a housing;
    a processor;
    a camera integrated with the housing and coupled to the processor;
    a memory coupled to the processor;
    a display coupled to the processor;
    a conferencing program stored in the memory and including functionality to access selectively and simultaneously, at least two data types including video data, text data, and application data during a conference from other participants in the conference;
    a synchronization cradle removably coupled to the handheld computer, the synchronization cradle enabling access to a conferencing server via the synchronization cradle and the synchronization cradle enabling the camera to be held at a substantially fixed orientation.

10. The handheld computer of claim 9, wherein the conferencing program provides functionality for a user to switch between the data types being accessed.

11. The handheld computer of claim 9, wherein the conferencing program provides a user interface on the display, the user interface being used to switch between data types being accessed.

12. The handheld computer of claim 9, wherein the conferencing server is accessed via a wireless communications link.

13. The handheld computer of claim 12, wherein the wireless communications link is an IEEE 802.11 link.

14. The handheld computer of claim 12, wherein the wireless communications link is a Bluetooth link.

15. A method of accessing data, comprising:
    mounting a handheld computer with an integrated camera in a synchronization cradle;
    establishing a videoconference using a handheld computer via the synchronization cradle;
    providing a video feed on the handheld computer, the video feed being at least a portion of a videoconferencing feed;
    providing an audio feed on the handheld computer, the audio feed being at least a portion of the videoconferencing feed;
    displaying simultaneously application data on the handheld computer, the application data being at least a portion of the videoconferencing feed.

16. The method of claim 15, further comprising:
    disabling, selectively, display of the video feed on the handheld computer.

17. The method of claim 15, further comprising:
    disabling, selectively, the audio feed on the handheld computer.

18. A method of accessing data, comprising:

placing a handheld computer in a synchronization cradle;

positioning a camera integrated into the handheld computer in a direction of a videoconference participant;

establishing a conference call using the handheld computer via the synchronization cradle;

outputting a first data type by the handheld computer, the first data type being one of video data, text data, and application data;

outputting a second data type simultaneously with the first data type, the second data type being different than the first data type and being one of video data, text data, and application data; and switching selectively between data types being output by the handheld computer, while maintaining the conference call.

19. The method of claim 18, further comprising:

outputting a third data type simultaneously with the first and second data types, the third data type being different than the first and second data types and being one of video data, audio data, text data, and application data.

20. The method of claim 18, further comprising:

terminating the output of one of the first data type and the second data type without terminating the conference call.

* * * * *